May 28, 1957 — F. W. SAMPSON — 2,793,793
METERING DEVICE
Filed Feb. 1, 1954 — 2 Sheets-Sheet 1
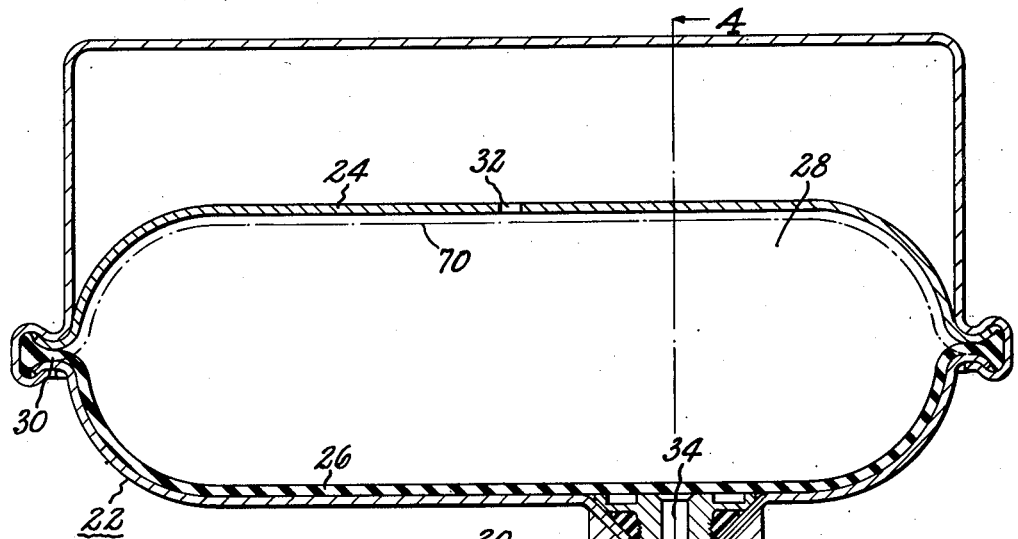
Fig. 1.
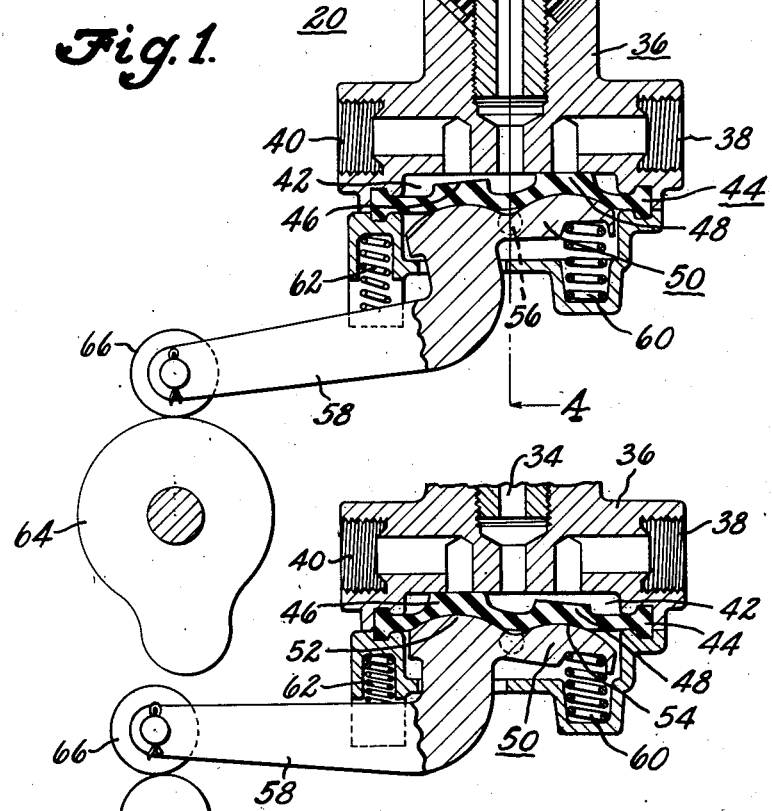
Fig. 2.
INVENTOR.
FREDERICK W. SAMPSON
BY
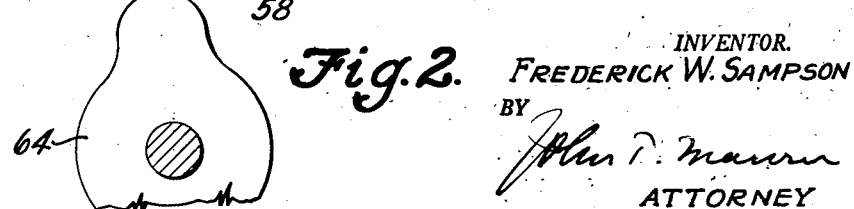
ATTORNEY May 28, 1957     F. W. SAMPSON     2,793,793
METERING DEVICE Filed Feb. 1, 1954     2 Sheets-Sheet 2

INVENTOR.
FREDERICK W. SAMPSON
BY
ATTORNEY

United States Patent Office 2,793,793
Patented May 28, 1957

2,793,793

METERING DEVICE

Frederick W. Sampson, Dayton, Ohio, assignor to General Motors Corporation, Detroit, Mich., a corporation of Delaware Application February 1, 1954, Serial No. 407,202

2 Claims. (Cl. 222—335)

This invention relates to fluid metering devices and is particularly concerned with a measuring and delivery device wherein a predetermined quantity of fluid is first measured out and is then delivered to a desired location.

It is, therefore, the main object of the present invention to provide a measuring and delivery device including a compartment of an expanding character which may be filled with the fluid from a source of supply and which will then deliver the fluid when desired in predetermined quantities, valving means being associated with the compartment for controlling the several functions thereof.

In carrying out the above object, it is a further object to utilize a flexible diaphragm within a closed tank, which diaphragm forms an expandable chamber or compartment upon introduction of fluid therein and wherein the tank forms a limit for the quantity of fluid which may be contained in the chamber, valving means being provided for causing the filling of the chamber with fluid and for then connecting the chamber to a point of delivery so that the fluid may be exhausted therefrom.

A still further object of the invention is to provide a metering device for use with an automatic ice maker or the like wherein a predetermined quantity of water is measured out and is then delivered at any desired time to the ice maker for freezing therein. The metering device may be controlled by the ice maker mechanism so that it is periodically filled and exhausted in timed relation to the specific functions of the ice maker.

Further objects and advantages of the present invention will be apparent from the following description, reference being had to the accompanying drawings, wherein preferred embodiments of the present invention are clearly shown.

In the drawings:

Fig. 1 is a view in cross section of a preferred form of a metering device wherein the expandable chamber is empty and the valving means is open to exhaust the contents thereof.

Fig. 2 is a fragmentary view in section of the valving means shown in Fig. 1 in the other position thereof wherein the measuring device is being filled with fluid from a source of supply.

Figures 3, 4:
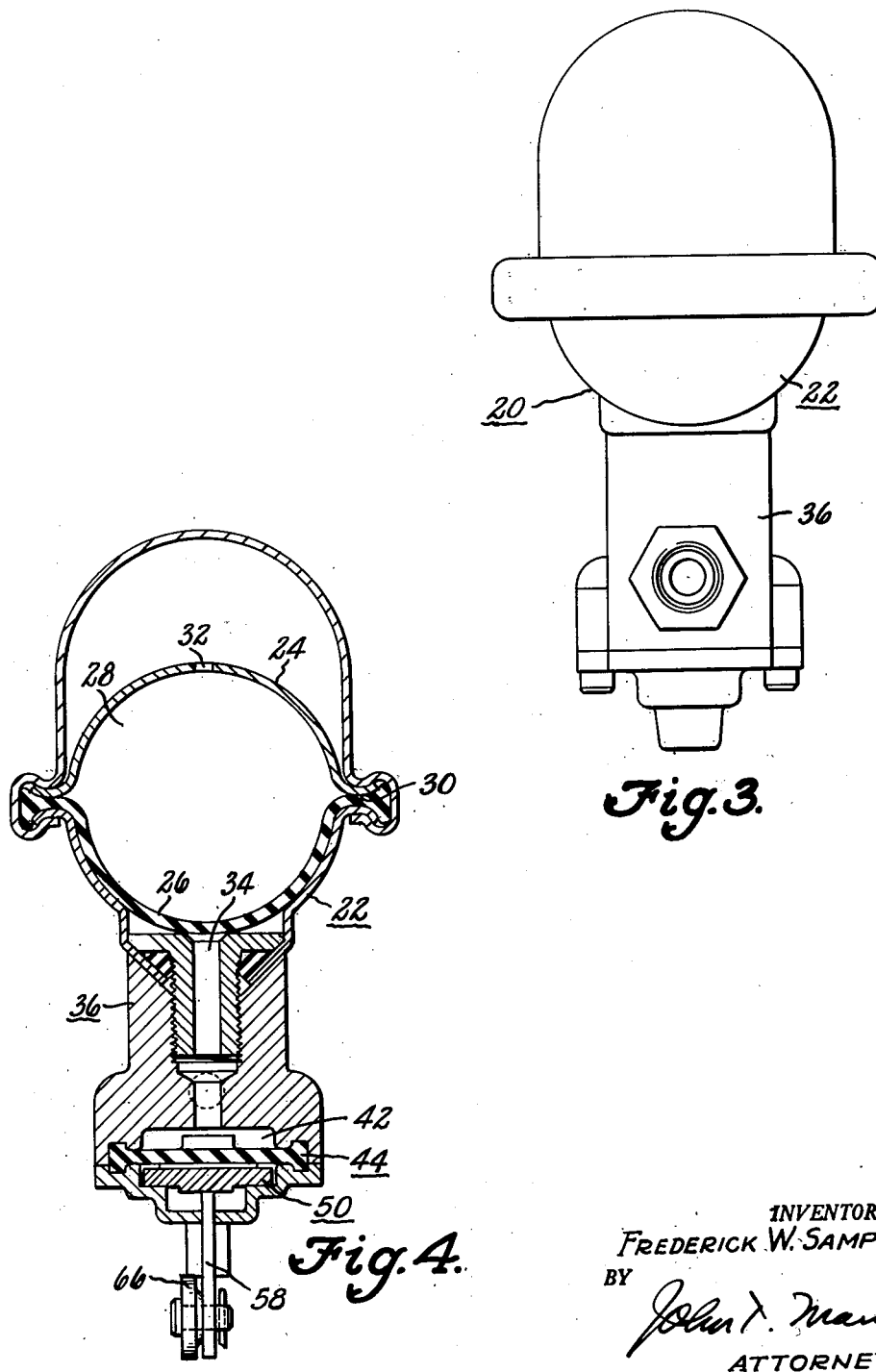
Fig. 3 is an end view of the device shown in Fig. 1.
Fig. 4 is a view in section taken on line 4—4 of Fig. 1.

The device, as disclosed, may be used for measuring and delivering predetermined quantities of any type of fluid, although, for practical purposes, the device is usually used with liquids, such as water or aqueous solutions to be measured and delivered. One of these uses is in connection with ice making machinery, such as disclosed and claimed in copending application, Serial No. 407,201, and now Patent 2,757,519 (Docket IN–430), filed concurrently herewith.

In this device, it is necessary to periodically supply a predetermined quantity of water to the freezing compartment or tray of the ice maker wherein it is frozen into cubes. After these cubes are freed and removed from the tray the measuring device is required to again deliver a predetermined quantity of water to the tray for a subsequent operation thereof. This action can be either automatically or manually controlled as the case may be. It is to be understood that the measuring device, while particularly applicable for use with an ice maker, is in no way limited to such use, but may be used in any application where fluids are desired to be measured and subsequently delivered in measured quantities.

Referring specifically to the drawings, a preferred embodiment of the invention is shown at 20 in cross section in Fig. 1 and comprises a tank or enclosure 22 divided by a partition 24 therein. The tank includes a flexible diaphragm 26 within one compartment 28 thereof. Compartment 28 will be referred to later as the measuring chamber. The diaphragm may be held in any satisfactory manner, preferably by crimping the same around its outer periphery as at 30, together with portions of the tank whereby the diaphragm is held in sealed relation by portions of the tank. The partition 24 is apertured at 32 while the upper portion of the tank 22 is fully enclosed to form a pressure chamber. At the lower side of the tank 22 is a delivery passage 34 connecting with a valve mechanism 36. The valve mechanism includes an inlet passage 38 and an outlet passage 40. The passages 34, 38 and 40 all open into a common chamber 42. A diaphragm 44 of resilient material is positioned in chamber 42 and is sealed around the periphery thereof in any suitable manner. The diaphragm 44 preferably includes pad members 46 and 48 formed integral therewith. A pivoted valving member 50 is journaled within the chamber 42 and beneath the diaphragm 44 and includes rounded abutment members 52 and 54 thereon which are positioned directly below the pads 46 and 48 respectively of the diaphragm 44. The abutment members 52 and 54 are on opposite sides of the pivot as noted at 56. A lever 58 extends from the valving member 50 and is positioned on one side or the other of the pivot, and, as shown, is positioned directly beneath the abutment member 52. It is understood that this lever 58 may be attached in any desired position for a specific function of the device as will be explained hereinafter.

In the present embodiment the valve 50 is biased by spring 60 so as to normally maintain the inlet passage 38 closed. A second spring 62 may also be provided and likewise acts on the lever 58. In view of these springs, the inlet 38 is maintained closed (See Fig. 1) except during periods when the lever 58 is raised (see Fig. 2) against the action of both springs which function in the same direction of pressure application.

In order to operate the valve mechanically, a cam 64 may be provided which rotates to engage a roller 66 at the extreme end of the lever 58. When engagement with the accentric lobe of the cam occurs, the valve 36 assumes the position shown in Fig. 2 wherein the inlet is open and the outlet is closed and vice versa.

Specifically referring to the operation of the device, the inlet 38 is preferably connected with a source of supply, for example, a water line wherein water under pressure is maintained. When the valve is in the position shown in Fig. 1, water cannot enter the delivery passage 34 since the diaphragm pad 48 closes the inlet passage. However, when the valve is in position shown in Fig. 2, water under pressure enters the inlet passage 38 and is permitted to enter through the connected delivery passage 34 into the tank 22. When this occurs the diaphragm 26 is flexed upwardly to the dotted line position shown at 70 in Fig. 1. In this position, all air that was in the compartment including the diaphragm has been forced through the vent 32 into the upper compartment of the tank 22. When the pressure in the chamber formed beneath the diaphragm 26 equalizes with the line pressure at the inlet 38 no further water enters the chamber.

When it is desired to deliver a predetermined quantity of water as measured in the lower compartment of the tank 22 the valve is moved to the position shown in Fig. 1, either manually or by a cam actuator as shown, whereupon the inlet 38 is closed and the delivery passage 34 is connected to the outlet passage 40. In this position the water may flow out of the lower compartment of the tank 22. This flow is aided by the pressure of the air in the upper compartment reentering the lower compartment through the vent 32 to press the diaphragm 26 downwardly until the position shown in full lines of Fig. 1 is reestablished. In this position a measured quantity of water has been exhausted from the chamber. It is apparent that when the valve is again moved either manually or by cam to the position shown in Fig. 2, the lower compartment of tank 22 will again be filled with a predetermined quantity of water.

It is understood that the design of the apparatus may be modified without deviating from the spirit of the invention and that the tank above the diaphragm 26 may be pressurized to hasten the exhaust of water from the chamber or the diaphragm 26 may be of sufficient resiliency to be stretched upon the filling of the compartment whereupon the inherent resilience of the diaphragm aids in exhausting the fluid from the compartment upon connection of the delivery passage 34 with the outlet passage 40. Similarly a weight may be used on top of the diaphragm or the chamber, all of such variations coming fully within the scope of the invention and within the purview of any one skilled in the art.

While the embodiments of the present invention as herein disclosed, constitute preferred forms, it is to be understood that other forms might be adopted.

What is claimed is as follows:

1. A measuring and delivery device adapted to be filled with a predetermined quantity of fluid and to subsequently deliver said fluid therefrom, the combination comprising; an outlet passage, an outlet passage and a delivery passage, said inlet passage being connected to a source of fluid, valving means associated with said passages and operable to connect either one of said inlet and outlet passages to one end of said delivery passage, a tank having a pair of compartments therein separated by a partition including an aperture therethrough wherein one of said compartments is connected to the other end of the delivery passage, a displaceable diaphragm in said one compartment and normally disposed adjacent one wall thereof whereby the volume between the diaphragm and said wall of the tank is substantially zero, and operable when fluid enters said delivery passage from said inlet passage to be yieldably displaced from said normal position into contact with said partition while simultaneously forcing and compressing the air above said diaphragm through said aperture into said other compartment until a predetermined volume of fluid is present, said diaphragm being adapted to empty the tank of its contents when said delivery passage is connected to said outlet passage by said valving means through the action of said compressed air reentering said diaphragm compartment and causing said diaphragm to assume its normal position and simultaneously to displace the fluid thereunder through said delivery and outlet passages.

2. A measuring and delivery device for delivering a predetermined quantity of fluid therefrom comprising in combination, a measuring chamber and an air pressure chamber separated therefrom by a partition and connected therewith through an aperture in said partition, said measuring chamber including a flexible diaphragm therein, normally in a position so that the volume of the chamber beneath the diaphragm is zero, valving means adapted to be connected to a source of fluid under pressure for allowing fluid to pass into said chamber beneath said diaphragm for flexing the diaphragm upwardly and for forcing air from said chamber outwardly through said aperture into said pressure chamber whereby a predetermined quantity of fluid enters the measuring chamber as determined by contact of the diaphragm with the partition, said valving means being operable to destroy the connection to the fluid source and open an outlet passage whereby the air under pressure in the upper compartment forces the diaphragm downwardly to dispel the fluid therebeneath outwardly through said outlet passags, said valving means being normally biased to the exhaust position.

References Cited in the file of this patent

UNITED STATES PATENTS

| 1,454,765 | Patterson et al. | May 8, 1923 |
| 1,911,094 | Skoglund | May 23, 1933 |
| 1,979,428 | Wheeler | Nov. 6, 1934 |

FOREIGN PATENTS

| 6,617 | Great Britain | Jan. 21, 1904 |